United States Patent [19]

Yamamoto et al.

[11] Patent Number: 4,929,949

[45] Date of Patent: May 29, 1990

[54] RADIO CONTROL TRANSMITTER HAVING IMPROVED DISPLAY CHARACTERISTICS

[75] Inventors: Michio Yamamoto; Satoshi Sekiya, both of Mobara, Japan

[73] Assignee: Futaba Denshi Kogyo K.K., Mobara, Japan

[21] Appl. No.: 184,670

[22] Filed: Apr. 22, 1988

[30] Foreign Application Priority Data

Apr. 24, 1987 [JP] Japan .................................. 62-099933

[51] Int. Cl.[5] .............................................. H04Q 9/14
[52] U.S. Cl. .................................. 341/176; 244/75 R; 340/825.62; 340/825.69; 340/825.72
[58] Field of Search .............. 340/696, 825.69, 825.62, 340/825.72; 244/75 R; 341/176

[56] References Cited

U.S. PATENT DOCUMENTS

| | | | |
|---|---|---|---|
| 4,572,996 | 2/1986 | Hanschke et al. | 340/825.69 |
| 4,739,311 | 4/1988 | Yamamoto et al. | 340/825.69 |
| 4,746,919 | 5/1988 | Reitmeier | 340/696 |
| 4,760,392 | 7/1988 | Yamamoto et al. | 340/825.69 |

Primary Examiner—Glen R. Swann, III
Attorney, Agent, or Firm—Oblon, Spivak, McClelland, Maier & Neustadt

[57] ABSTRACT

A radio control transmitter, and more particularly, a digital radio control transmitter uses analog digital conversion within the transmitter and provides improved display characteristics of the trim settings involved with respect to the various control sticks for providing radio remote control of the movement of model objects such as model airplanes, model helicopters, model cars or the like. An improved display shows the various trim characteristics and actual settings of the various control sticks during the operation.

6 Claims, 6 Drawing Sheets

RADIO CONTROL TRANSMITTER HAVING IMPROVED DISPLAY CHARACTERISTICS

BACKGROUND OF THE INVENTION

1. Field of the Invention

This invention relates to a radio control transmitter, and more particularly to a radio control transmitter for carrying out radio remote control of movement of a model object such as a model airplane, a model helicopter, a model car or the like.

2. Description of the Prior Art

Conventionally, various kinds of radio control transmitters have been used for carrying out remote control of model airplanes or the like.

A conventional radio control transmitter is typically constructed in such a manner as is shown in FIG. 2. More particularly, the conventional transmitter generally designated at reference numeral 101 includes two sticks 102 and 103 arranged so as to pivotally moved in directions indicated at arrows A and B and those of C and D, respectively. Pivotal movement of the stick 102 in the directions of the arrows A and B causes an elevator and a rudder of a model airplane which is an object to be controlled (hereinafter referred to as "controlled object") to be controlled, whereas pivotal movement of the stick 103 in the directions of the arrows C and D controls a throttle and an aileron of the model airplane. The transmitter 101 also includes trims 104 and 106 for carrying out the fine adjustment of neutral positions of the stick 102 for the elevator and rudder, respectively, and trims 105 and 107 for carrying out fine adjustment of neutral positions of the stick 103 for the throttle and aileron. Reference numeral 114 designates an indicator for indicating a value of voltage of a battery or the like. The transmitter 101 further includes cylindrical control knobs 201 and 202 for exponential function of exponentially varying control characteristics of the sticks 102 and 103 for the rudder and throttle, respectively, and a transmitter antenna 112. In addition, the transmitter 101 is provided at a lower portion thereof with a segment display section 203 and a setting switch 204. The display section 203 is adapted to display a current time, an elapsed time or the like at alphabets and numerals depending on operation of the setting switch 204.

Control of a controlled object by means of the transmitter 101 constructed as described above is carried out in such a manner that the trims 104-107 and knobs 201 and 202 are suitably set while observing scales arranged adjacent thereto, and then the sticks 102 and 103 are operated. An elapsed time after start of the operation or the like is displayed at the display section 203.

The radio control transmitter described above permits operation of the trims and control or adjusting knobs to vary control characteristics of the sticks. However, the amount of control of the sticks by the trims and adjusting knobs is indicated only by the scales arranged adjacent thereto, resulting in the transmitter failing to indicate its whole control characteristics set. Accordingly, the transmitter causes operation of the sticks to fail to specify movement of the controlled object, resulting in the fine remote control of the controlled object being highly difficult.

SUMMARY OF THE INVENTION

The present invention has been made in view of the foregoing disadvantage of the prior art.

Accordingly, it is an object of the present invention to provide a radio control transmitter which is capable of visually displaying its control characteristics, resulting in exhibiting good operability.

In accordance with the present invention, a radio control transmitter is provided. The radio control transmitter includes a data conversion section for generating a digital output signal depending on operation of sticks, a setting section for setting operation of the sticks and generating an output signal, an operation section for processing the output signals generated from the data conversion section and setting section to generate an output signal, a high-frequency section for modulating the output signal of the operation section into a high-frequency signal in the form of a predetermined shape and generating it therefrom, and a graphic display section for displaying control characteristics of the sticks with respect to a controlled object depending on the output signal of the operation section.

Thus, in the present invention, control characteristics of the transmitter with respect to a controlled object are visually displayed in the form of a graph or the like depending on the output signal of the setting section.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout; wherein.

DETAILED DESCRIPTION OF THE PREFERRED EMBODIMENT

Now, a radio control transmitter according to the present invention will be described hereinafter with reference to the accompanying drawings.

Figure 1:
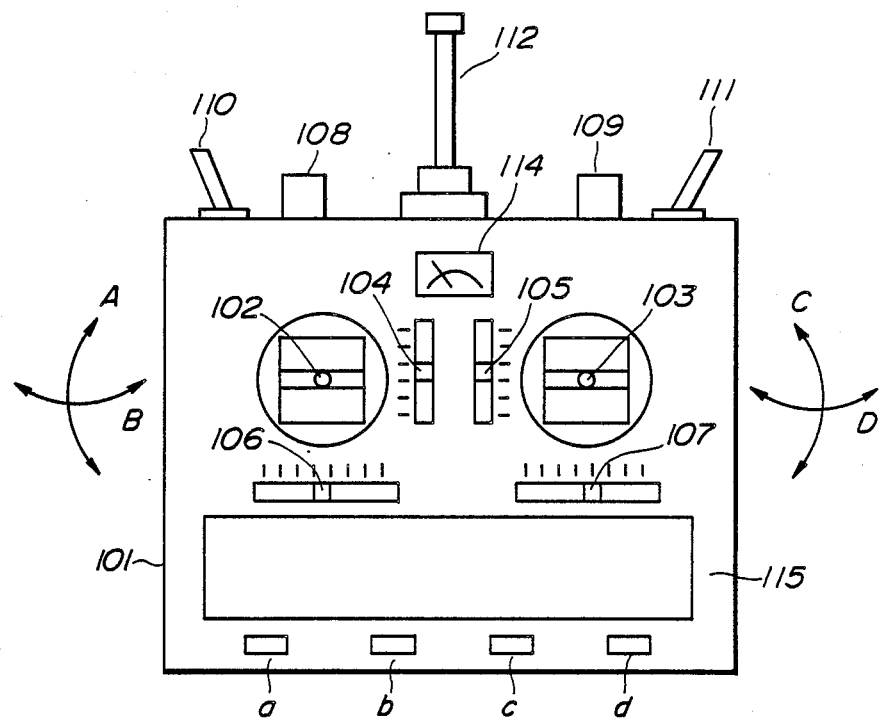
FIG. 1 is a front elevation view showing an embodiment of a radio control transmitter according to the present invention.
Figure 2:
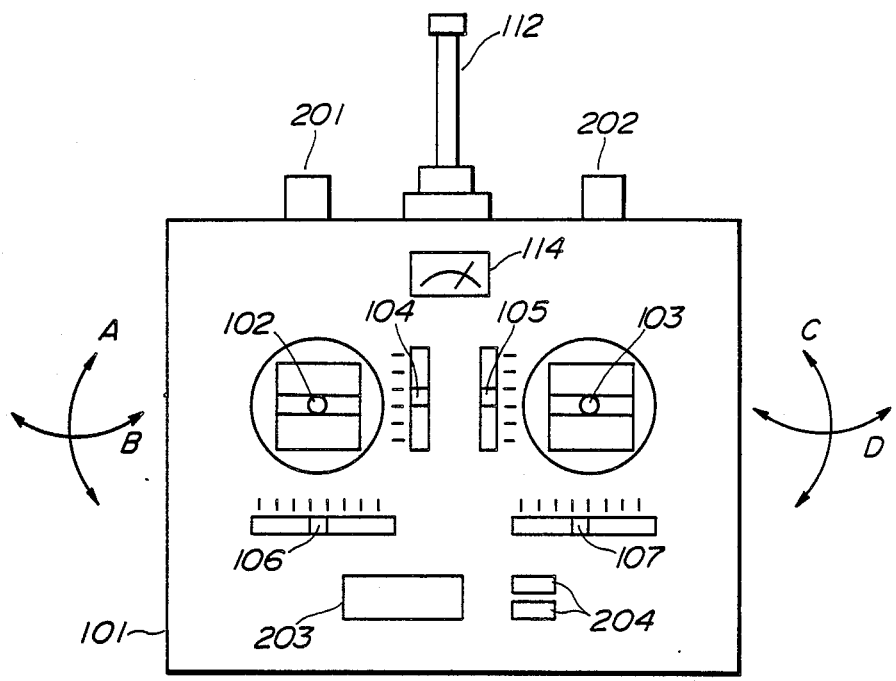
FIG. 2 is a front elevation view showing a conventional radio control transmitter.

FIG. 1 shows an embodiment of a radio control transmitter according to the present invention, wherein reference characters in FIG. 1 like those in FIG. 2 designate corresponding parts.

A radio control transmitter of the illustrated embodiment generally indicated at reference numeral 101 includes an adjusting knob 108 for finely adjusting the amount of idle-up of a throttle servo. The amount of idle-up of the throttle servo controlled by a stick 103 is adjusted by turning on a toggle switch 110. The transmitter 101 also includes an adjusting knob 109 for carrying out fine adjustment of the throttle servo at the time of hovering of a model helicopter, regardless of mixing separately set and a toggle switch 111 for holding the throttle servo at a predetermined value. The transmitter 101 is provided at a lower portion with a group of function keys a–d which are soft keys for carrying out setting various functions such as exponential, mixing and the like and a graphic display unit 115 depending on operation of a control section which includes the function keys a–d, a stick 102, the stick 103, the knobs 108 and 109, and the like.

The remainder of the radio control transmitter of the illustrated embodiment may be constructed in substantially the same manner as the conventional transmitter shown in FIG. 2.

Figure 3:
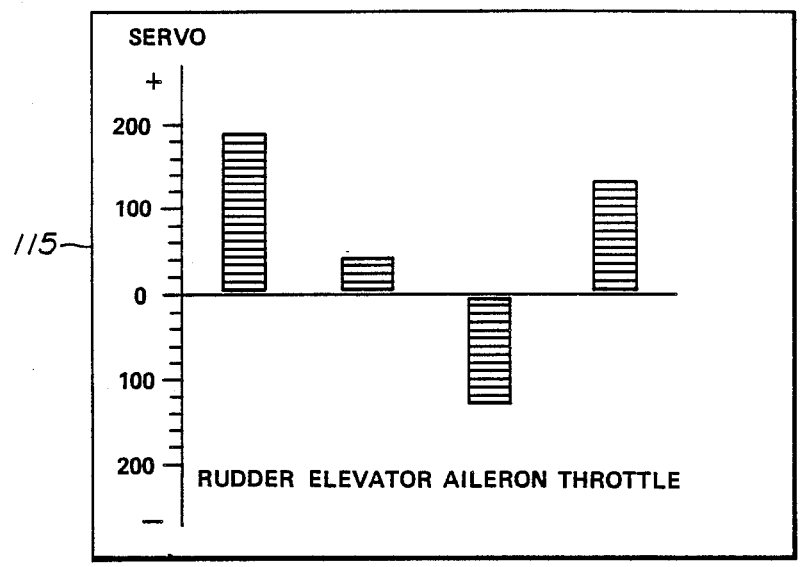
FIGS. 3 to 8 each are a view showing a display carried out by a display section of the radio control transmitter shown in FIG. 1.
Figure 4:
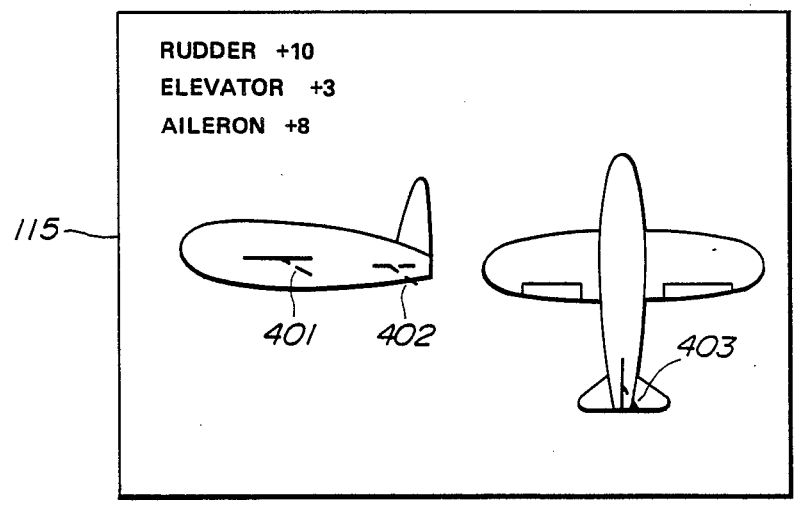
Figure 5:
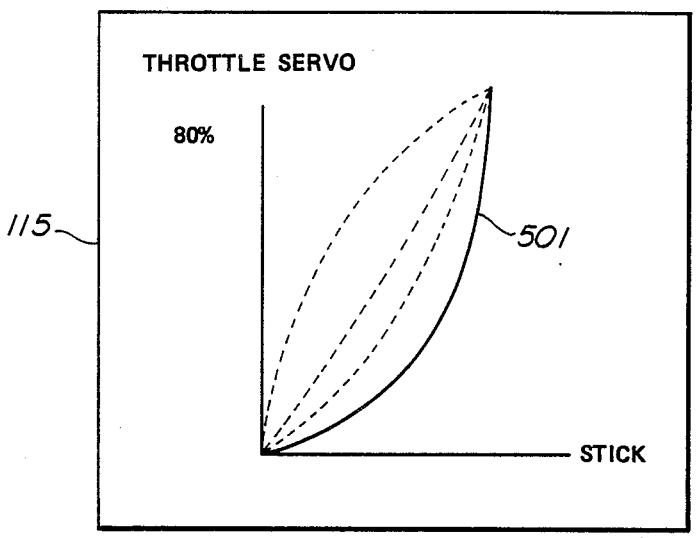

The display unit 115 is adapted to carry out various kinds of displays, as shown in FIGS. 3 to 8, wherein indication of soft keys corresponding to the function keys a–d is eliminated for the sake of brevity. FIG. 3 shows the amount of control of an elevator, a rudder, a throttle and an aileron by the sticks 102 and 103 depending on operation of the function keys a–d together with their control directions. Also, FIG. 3 shows results obtained by operating the stick 102 in right and upward directions and the stick 103 in left and downward directions. In FIG. 3, a scale shown at its left end indicates the number of pulses supplied to each of servo motors, which is proportional to an angle of rotation of the servo motor. Alternatively, it may indicate an angle of rotation of each of controlled sites or members in place of the number of pulses, as shown in FIG. 4. In FIG. 4, a model airplane is used as a controlled object and a display of FIG. 4 is varied depending on operation of the sticks 102 and 103 so that an aileron 401, elevator 402 and a rudder 403 may be moved in substantially the same manner as actual movement of the controlled object as indicated at dotted lines. FIG. 5 shows a display obtained when control characteristics for a throttle survo are set in the form of various exponential characteristics by operation of the function keys a–d. More particularly, A curve 501 indicates relationships between the amount of operation of stick 103 and the amount of movement of the throttle servo which are obtained by operation of the function keys a–d. The curve 501 is varied as indicated at curves of dotted lines depending on operation of the function keys a–d. Also, other functions such as, for example, setting of characteristics of an elevator and a rudder, the amount of mixing and the like ar indicated in a similar manner. After the setting, the display section can carry out a display for confirmation by operation of the function keys and/or a display of additional setting.

Figure 6:
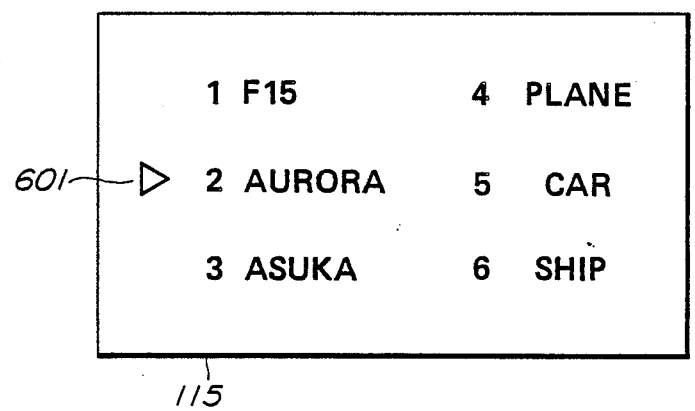

Further, the display unit 115 functions to store control characteristics of the transmitter 101 for every controlled object, to thereby display control characteristics of the transmitter being used for a controlled object depending on a name of the controlled object, as shown in FIG. 6. More particularly, FIG. 6 shows an example wherein control characteristics for six kinds of controlled objects are stored in the display unit 115. A cursor 601 indicates that control characteristics being used are for a controlled object named AURORA.

Figure 7:
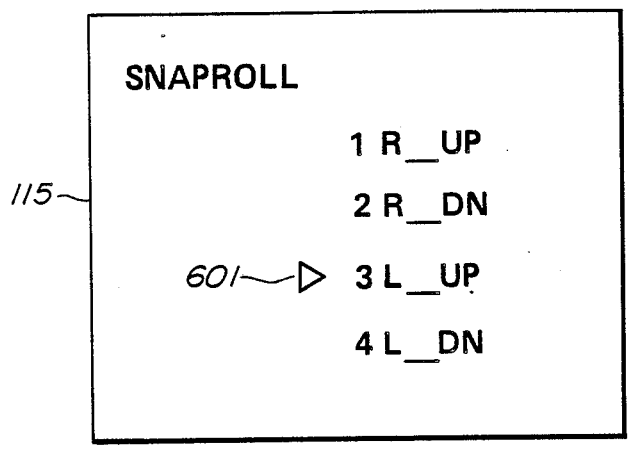

Operation of the function keys a–d causes the cursor 601 to be moved to select control characteristics for another controlled object, so that the sticks 102 and 103 may be operated according to the selected control characteristics. FIG. 7 shows a display of the display unit 115 indicating a function of the transmitter 101 being used. FIG. 7 exemplifies a snaproll for causing a model airplane to ascend or descend while turning right or left, wherein "R_UP" indicates ascending of an airplane while turning right, "R_DN" is descending of it while turning right, "L_UP" is ascending of it while turning left, and "L_DN" is descending of it while turning right. In FIG. 7, a cursor 601 indicates that a third function "L_UP" has been or is being selected. Operation of the function causes the airplane to ascend while turning left.

Figure 8:
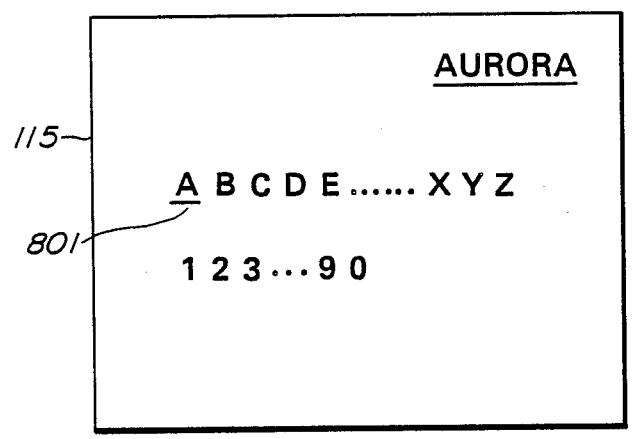

FIG. 8 shows a display for carrying out naming of each of controlled objects as described above with reference to FIG. 6. Alphabets and numerals are displayed at a central portion of the display unit 115. Input of each name to the display unit is accomplished by pushing the function key d to move the cursor 801 beneath a desired alphabet or numeral and then pushing the function key b. Alphabets and numerals successively input to the display unit 115 are displayed on a top right-hand corner of the display unit 115. FIG. 8 exemplifies input of "AURORA" to the display unit 115.

Figure 9:
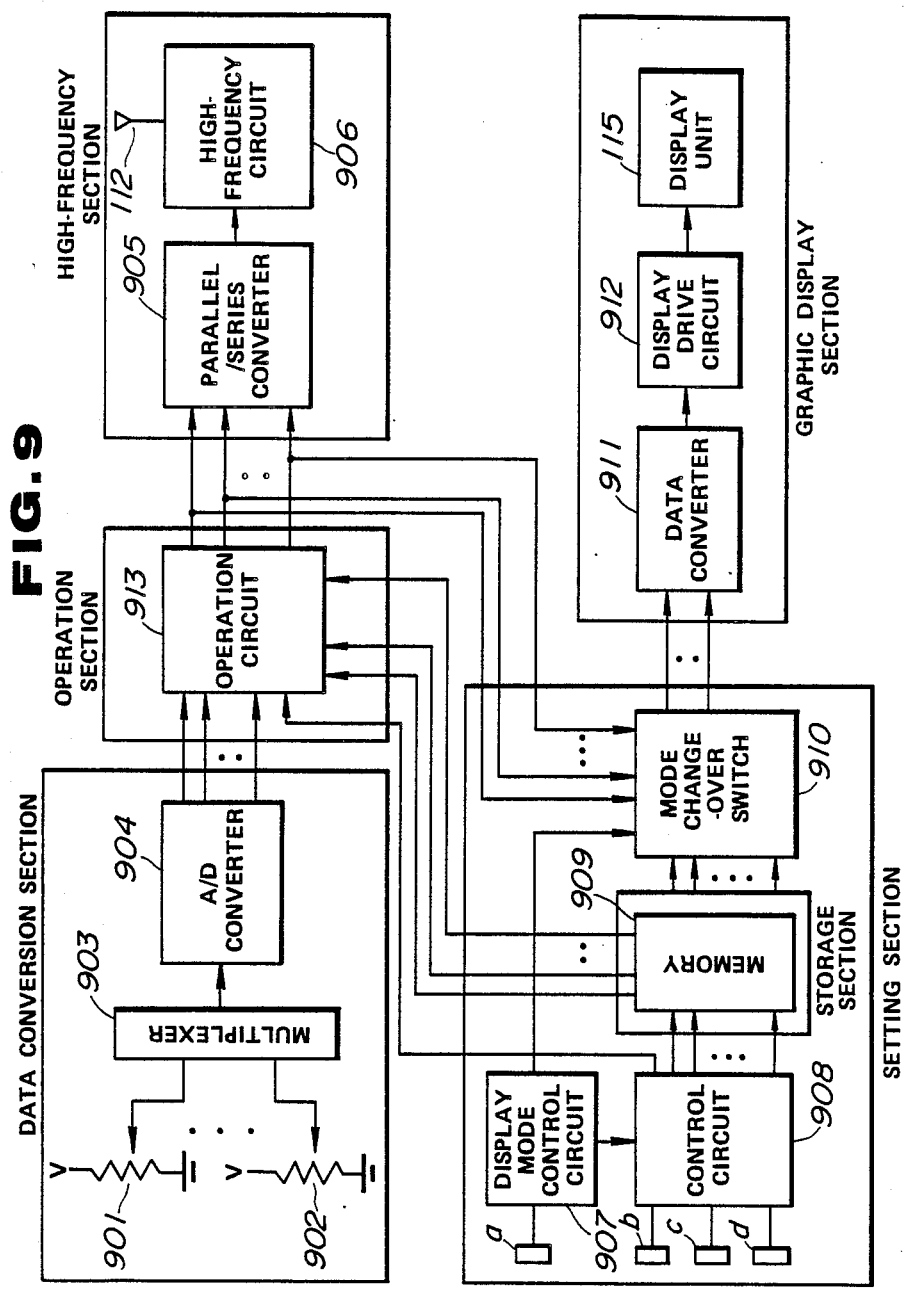
FIG. 9 is a block diagram of the radio control transmitter shown in FIG. 1.

FIG. 9 is a block diagram schematically showing the radio control transmitter of FIG. 1. As shown in FIG. 9, the radio control transmitter generally includes a data conversion section, an operation section, a high-frequency section, a setting section, a storage section and a graphic display section. In the illustrated embodiment, the storage section is incorporated in the setting section. The data conversion section includes variable resistors 901 and 902 each connected to a DC power supply V. The variable resistors 901 and 902 are varied in resistance depending on operation of the sticks 102 and 103 shown in FIG. 1 to generate analog voltages depending on the amount of operation of the sticks 102 and 103, which are then inputted to a multiplexer 903. The multiplexer 903 serves to supply output signals of the variable resistors 901 and 902 to an analog/digital (A/D) converter 904 in turn. The A/D converter 904 then converts the supplied analog signal to a parallel digital signal, which is then supplied through an operation circuit 913 constituting the operation section to a parallel/ series converter 905 of the high-frequency section. The converter 905 converts the supplied parallel digital signal to a series digital signal and supplies it to a high-frequency circuit 906, which modulates the supplied digital signal and then transmits it from an antenna 112.

The above-described function keys a–d constitute a part of the setting section. The function key a for control of a display mode is connected through a display mode control circuit 907 to a control circuit 908 and a mode change-over switch 910 of the setting section. The function keys b–d are connected to an input terminal of the control circuit 908. The control circuit 908 is connected at output terminals thereof to a control terminal of the operation circuit 913 of the operation section and an input terminal of a memory 909 of the storage section. In the illustrated embodiment, as described above, the storage section constitutes a part of the setting section, as shown in FIG. 9. The memory 909 is connected at output terminals thereof to the input terminals of the operation circuit 913 and to the input terminals of the mode change-over switch 910. Another input terminal of the mode change-over switch 910 is connected to one of the output terminals of the operation circuit 913. The mode change-over switch 910 is further connected at one of the output terminals thereof to the graphic display section. More particularly, it is connected through a data conversion circuit 911 and a display drive circuit 912 of the display section to the display unit 115 of the display section.

Output signals of the variable resistors 901 and 902 generated depending on the amount of operation of the sticks 102 and 103 are supplied to the A/D converter 904 in a predetermined order for every channel by the multiplexer 903. The A/D converter 904 converts an analog signal supplied thereto from the multiplexer 903 to a digital signal and supplies it to the operation circuit 913. The operation circuit 913 carries out processing of data stored in the memory 909 and the output signal of the A/D converter 904 for every channel in response to a control signal of the control circuit 908 and then supplies its output signal to the parallel/series converter 905 and mode change-over switch 910. Signals supplied from the memory 909 to the operation circuit 913 and mode change-over switch 910 are data set by the function keys a-d as described hereinafter. The data are, for example, for causing the sticks 102 and 103 to exhibit an exponential function and carrying out mixing of the respective channels. The parallel/series converter 905 serves to convert a parallel signal generated from the operation circuit 913 to a series signal. The high-frequency circuit 906 modulates the series signal and then transmits it from the antenna 112 to a controlled object. Thus, control characteristics of the sticks 102 and 103 are varied depending on functions set by the function keys a-d, for example, an exponential function, a mixing function and the like, resulting in the controlled object being controlled as desired.

Now, setting and a display of each function will be described. First, the manner of setting of the function will be described. For example, when throttle servo control characteristics of the stick 103 are to be set in the form of exponential characteristics shown in FIG. 5, the function key a is pushed a predetermined number of times to set the control circuit 908 to an exponential setting mode by the display mode control circuit 907 and set the mode change-over switch 910 to a mode for supplying an output signal of the memory 909 to the data conversion circuit 911. At this time, data stored in the memory 909 are supplied through the mode change-over switch 910 to the data converter circuit 911. The data conversion circuit 911 converts the signal supplied through the mode change-over switch 910 to display data, which is then supplied to the display drive circuit 912.

The display drive circuit 912 drives the display unit 115 in response to the display data in a conventional manner. Selection of a throttle servo by the function key b causes a graph shown in FIG. 5 to be displayed on the display unit 115. A characteristic curve displayed is only the curve 501 of a solid line. On a top left-hand portion of the display unit 115, it is displayed that the amount of exponential is 80%. As the function key c is pushed, the control circuit 908 rewrites data of the throttle servo stored in the memory 909. Correspondingly, the curve 501 is varied in order as indicated at curves of dotted lines and correspondingly an indication of the amount of exponential is also varied. Operation of the function key c after pushing of the function key d also causes the solid line curve 501 to be varied in an opposite direction. When a controlled object is to be controlled, the operation circuit 913 supplies a signal corresponding to characteristics indicated at the solid line in FIG. 5 to the parallel/series conversion circuit 905 depending on the data stored in the memory 909 and the amount of operation of the stick 103. This results in the stick 103 being operated to lead to control of the throttle servo at exponential characteristics indicated at the solid line curve 501 in FIG. 5.

Now, the manner of display of a name of each controlled object stored in the memory 909 will be described with reference to FIG. 6. First, the function key a is operated to change a display mode. In response to operation of the function key a, the display mode control circuit 907 changes over the mode change-over switch 910 so as to supply an output signal of the memory 909 to the data converter 911. Also, the control circuit 908 carries out control to read out a specific data stored in the memory 909 in response to a signal from the mode change-over switch 910, resulting in a display shown in FIG. 6. Then, operation of the function key d causes the cursor 601 to be moved and a control data corresponding to movement of the cursor is supplied from the memory 909 to the operation circuit 913.

The operation circuit 913 carries out processing of signals supplied from the A/D converter 904 and memory 909 and then supplies its output signal to the parallel/series converter 905. This causes the controlled object to be controlled according to controlled characteristics shown in FIG. 6.

A display shown in FIG. 7 may be carried out in a manner similar to FIG. 6. The function key a is operated to obtain the display of FIG. 7 and then the function key d is operated to move the cursor 601, to thereby select a function to be used.

A display shown in FIG. 8 likewise may be obtained. First, the function key a is operated to carry out the display of FIG. 8. Then, the function key d is operated to move a cursor 801 beneath a desired alphabet or numeral and then the function key d is further operated to carry out input of it to the display unit 115.

Now, the manner of display of the amount of rotation of a servo motor of a controlled object or the mount of movement of a controlled site of a controlled object such as a rudder or the like will be described.

First, a display of FIG. 3 will be described. When the function key a is operated to obtain the display of FIG. 3, a control signal is supplied from the display mode control circuit 907 to the control circuit 908 and mode change-over switch 910. In response to the supply, the control circuit 908 carries out control so that all display data shown in FIG. 3 including a scale other than its bar graph portion may be supplied to the mode change-over switch 910. The memory 909 supplies data such as exponential characteristics, mixing characteristics and the like to the operation circuit 913. The mode change-over switch 910 supplies the signal from the memory 909 indicating the scale and the like and the signal from the operation circuit 913 to the data conversion circuit 911. When the sticks 102 and 103 each are at a neutral position, the bar graph portion is not displayed. Operation of the stick 102 in a right upward direction and the stick 103 in a right downward direction causes a bar graph of lengths and polarities corresponding to the amount of operation and directions as shown in FIG. 3 to be displayed. The lengths and poralities of the bar graph correspond to the number of pulses supplied to a servo motor of a controlled object and are proportional to an angle of rotation of the servo motor. An indication of the scale may be caused to correspond to the angle. FIG. 4 may display movement of each controlled member of a controlled object depending on operation of the sticks 102 and 103 and exemplifies a display obtained when the controlled object is an a model airplane. The display of FIG. 4 is obtained in substantially the same manner as that of FIG. 3.

First, the function key a is operated to obtain display of FIG. 4. The display unit 115 displays a side view and a plan view of a model airplane. Also, the display unit displays, on a top left-hand portion of an image plane thereof, an angle of rotation of each of a rudder 403, elevator 402 and aileron 401. When the sticks 102 and 103 each are at a neutral position, the side and top of the airplane are indicated only by solid lines and a numeral indicating the angle of rotation is "0". Operation of the sticks 102 and 103 causes the rudder 403, elevator 402 and aileron 401 to be rotated. Positions of dotted lines in FIG. 4 indicate that an angle of rotation of the rudder is +10 degrees, that of the elevator is +3 degrees and that of the aileron is +8 degrees. This corresponds to actual movement of the controlled object.

As described above, the display section accomplishes a display depending on operation and setting of the control section, so that control characteristics of the transmitter and actual movement of the controlled object may be confirmed, resulting in the controlled object being readily controlled.

The embodiment has been mainly described in connection with a model airplane. However, the present invention can be applied to other models such as a model helicopter, a model car and the like. For example, when it is applied to a model car, steering characteristics may be graphically displayed depending on operation of the sticks. Likewise, the present invention attains a display and setting of an ATV (adjustable travel volume) function which permits a width of operation of a servo motor to be adjusted independently on right and left sides, a VTR (variable trace ratio) which causes control characteristics with respect to a servo motor to vary in a manner like a broken line, and the like.

As can be seen from the foregoing, the radio control transmitter of the present invention carries out a graphical display depending on a signal from the control section, so that control characteristics of the transmitter may be visually confirmed, resulting in exhibiting good operability.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A radio control transmitter comprising:
   a data conversion section for generating digital output signals responsive to the operation of control sticks;
   a setting section for setting a trimming operation of said control sticks for adjusting said output from said control sticks and for generating output signals;
   an operation section for processing the output signals of said data conversion section and setting section to generate output signals;
   a high-frequency section for modulating the output signal of said operation section into a high-frequency signal in the form of a predetermined shape and generating said signal; and
   a graphic display section of displaying control characteristics of said control sticks with respect to a controlled object responsive to the output signal of said operation section.

2. A radio control transmitter as defined in claim 1, wherein said display section displays the number of pulses supplied to a servo motor of said controlled object in the form of a bar graph responsive to the operation of said control sticks.

3. A radio control transmitter as defined in claim 1, wherein said display section displays movement of a controlled site of said controlled object responsive to the operation of said control sticks.

4. A radio control transmitter as defined in claim 1, wherein the mechanical versus electrical characteristics of said control sticks are displayed.

5. A radio control transmitter as defined in any one of claims 1 to 4, wherein said setting section includes a storage section for storing control characteristics of said control sticks with respect to a plurality of controlled objects.

6. A radio control transmitter as defined in claim 5, wherein said setting section permits said control characteristics with respect to a plurality of said controlled objects to be writable and readable with respect to said storage section.

* * * * *